US011953028B2

(12) United States Patent
Buitendag et al.

(10) Patent No.: US 11,953,028 B2
(45) Date of Patent: Apr. 9, 2024

(54) FLOW CORRECTOR AND PUMP ASSEMBLY INCLUDING A FLOW CORRECTOR

(71) Applicant: BATTLEMAX (PTY) LTD, Centurion (ZA)

(72) Inventors: Marthinus Jacobus Buitendag, Centurion (ZA); Conrad Gräbe De Villiers, Centurion (ZA); Adian Brandt, Centurion (ZA)

(73) Assignee: BATTLEMAX (PTY) LTD, Centurion (ZA)

( * ) Notice: Subject to any disclaimer, the term of this patent is extended or adjusted under 35 U.S.C. 154(b) by 132 days.

(21) Appl. No.: 17/761,472

(22) PCT Filed: Sep. 16, 2020

(86) PCT No.: PCT/ZA2020/050048

§ 371 (c)(1),
(2) Date: Mar. 17, 2022

(87) PCT Pub. No.: WO2021/056036

PCT Pub. Date: Mar. 25, 2021

(65) Prior Publication Data

US 2022/0349422 A1 Nov. 3, 2022

(30) Foreign Application Priority Data

Sep. 17, 2019 (ZA) ................................ 2019/06122

(51) Int. Cl.
*F04D 7/04* (2006.01)
*F04D 29/44* (2006.01)

(52) U.S. Cl.
CPC ............ *F04D 7/04* (2013.01); *F04D 29/448* (2013.01); *F05D 2250/51* (2013.01)

(58) Field of Classification Search
None
See application file for complete search history.

(56) References Cited

U.S. PATENT DOCUMENTS 4,802,818 A * 2/1989 Wiggins ................ F04D 29/448 415/197
9,422,829 B2 * 8/2016 Walker .................. F04D 29/448
2005/0263199 A1 12/2005 Meheen
2013/0202426 A1 * 8/2013 Walker .................... F04D 29/44 415/203
2015/0300371 A1 10/2015 Mehlhorn

FOREIGN PATENT DOCUMENTS

EP 3309405 A1 4/2018
JP S56127381 U 9/1981

OTHER PUBLICATIONS

International Search Report and Written Opinion for Application No. PCT/ZA2020/050048 dated Dec. 4, 2020 (9 pages).

* cited by examiner

*Primary Examiner* — Juan G Flores
(74) *Attorney, Agent, or Firm* — MICHAEL BEST & FRIEDRICH LLP

(57) ABSTRACT

A flow corrector (14) which includes a tubular body (40) with an entry end (42) and an exit end (44), and a plurality of parallel flow passages (54*a*, 54*b*, 54*c*, 54*d*) between the entry end and the exit end.

10 Claims, 5 Drawing Sheets

FLOW CORRECTOR AND PUMP ASSEMBLY INCLUDING A FLOW CORRECTOR

CROSS REFERENCE TO RELATED APPLICATIONS

This application is a U.S. National Phase application of International Application PCT/ZA2020/050048 filed Sep. 16, 2020, which claims priority to South African Patent Application No. 2019/06122 filed Sep. 17, 2019, the entire contents of both of which are herein incorporated by reference.

BACKGROUND OF THE INVENTION

This invention relates generally to a flow corrector for use with a slurry pump.

By virtue of the medium which is handled, a slurry pump is subjected to significant abrasive forces. Also, particularly in existing installations where there are space constraints, slurry flow to an inlet of the pump can be of a non-uniform nature, have an uneven directional velocity profile, and have a mean velocity magnitude with a high standard deviation of velocity components. Increased relative flow changes throughout the pump occur, resulting in non-optimal internal pump component wear, and reducing the operational lifespan of the pump.

Another practical aspect is that as a suction pipeline between a slurry source and a pump inlet is usually of a rigid nature, pipeline maintenance in the region of the pump can be difficult and is potentially unsafe.

An object of the invention is to address, at least to some extent, the aforementioned adverse factors.

SUMMARY OF THE INVENTION

The invention provides, in the first instance, a flow corrector which includes a tubular body with an entry end and an exit end, and a plurality of parallel flow passages between the entry end and the exit end.

The cross sectional areas of the flow passages may be substantially the same.

A flange may be provided at one, or both, of the ends of the tubular body for facilitating connection of the body to a pump or to a slurry supply pipeline. Preferably a flange is provided at least at the exit end to facilitate connection of the body to a pump.

The tubular body may be made from any appropriate material. In one embodiment the body is made from a non-metallic material such as rubber or a plastics material e.g. polyurethane. In another embodiment the body is made from a metallic material e.g. by casting from a wear-resistant material such as a high chrome alloy. Optionally the body, when made from a metallic material, is internally lined with a wear-resistant liner e.g. of rubber or polyurethane.

The flow passages may be formed by structure which positions the passages adjacent one another. Adjacent flow passages may be separated from each other by a common wall. The structure, at an end thereof which is adjacent the entry end to the tubular body, may include a wear-resistant portion against which a part of the slurry flow, through the tubular body, directly impacts. The wear-resistant portion may be made from a high chrome material.

The tubular body may have one or more handles on an external surface to facilitate handling thereof. Each handle may be integrally moulded with the body.

The flow corrector may have a tubular section which extends from the entry end of the tubular body. An interior of this section may be unobstructed i.e. it is devoid of any portion of the flow passages.

In one form of the invention a free end of the section i.e. an end which is remote from the tubular body, carries a flange.

In another form of the invention the section is configured to be coupled to an extension piece by means of an appropriate connector such as a straub coupling. That extension piece may be configured to be used with a split flange. Additionally, when the extension piece is coupled to the aforementioned tubular section which extends from the entry end of the tubular body, by means of, say, the straub coupling, a clearance gap may be formed between opposing ends of the section and the extension piece—this feature facilitates removal and replacement of the flow corrector and other components thereby assisting with installation and maintenance processes.

The invention further extends to a pump assembly which includes a pump and a flow corrector, the pump comprising a housing, an inlet to the housing, an impeller mounted inside the housing for rotational movement about an axis which is centred on the inlet, and the flow corrector including a tubular body with an entry end connected to a discharge end of a slurry supply line and an exit end connected to the inlet to the housing, and wherein an interior of the tubular body is configured to correct flow through the tubular body into the housing.

The tubular body may have an elongate axis which is axially aligned with the axis of rotation of the impeller.

The tubular body may include a plurality of parallel flow passages extending between the entry end and the exit end. The cross sectional areas of the flow passages may be substantially the same.

The inlet to the housing may have a cross sectional area which is substantially equal to the total of the cross sectional areas of the flow passages.

The flow corrector in the pump assembly may include one or more of the features which have been described in connection with the aforementioned flow corrector.

The tubular body may include a flange at the exit end which is mated to a complementary flange at the housing inlet.

A clearance gap may be provided between the entry end of the tubular body and the discharge end of the slurry supply line. A connection between the tubular body and the discharge end of the slurry supply line may be effected by making use of an external pressure coupling e.g. of the kind known as a Victaulic™ coupling. This type of coupling is exemplary only and non-limiting. A benefit of this type of coupling is that it enables a clearance gap to be established between opposing ends of the components which are connected together by means of the coupling. This feature facilitates installation and maintenance processes.

The tubular body may be made from a wear-resistant material such as rubber or polyurethane. In a variation the body is made from a metallic wear-resistant material e.g. a high chrome alloy. An interior of the metallic tubular body may be covered with a wear-resistant liner of rubber or polyurethane or any similar material.

BRIEF DESCRIPTION OF THE DRAWINGS

The invention is further described by way of examples with reference to the accompanying drawings in which.

DESCRIPTION OF PREFERRED EMBODIMENT

Figure 1:
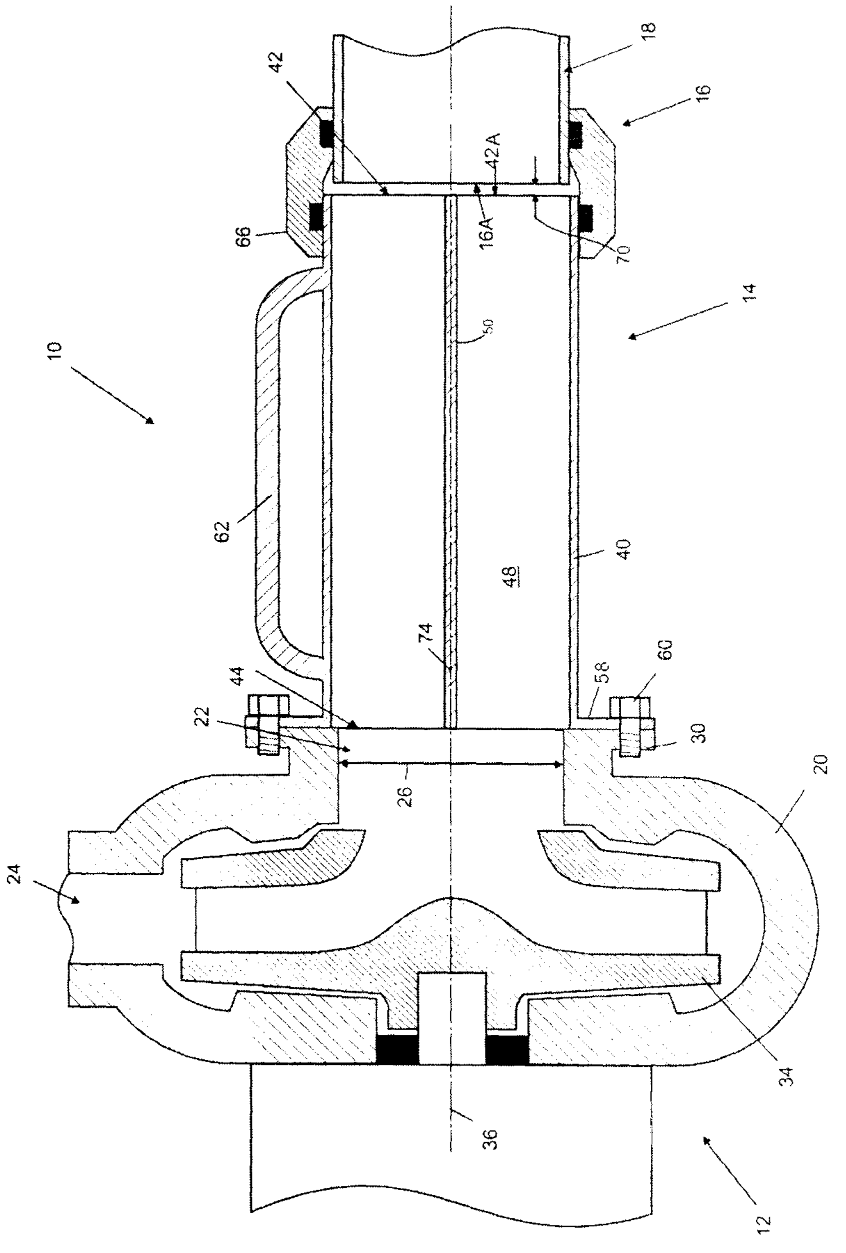
FIG. 1 is a side view in section of a pump assembly according to the invention.

FIG. 1 of the accompanying drawings is a side view in cross section of a pump assembly 10 according to the invention.

The pump assembly 10 includes a centrifugal slurry pump 12, and a flow corrector 14 which is connected to a discharge end 16 of a slurry supply line 18.

The centrifugal pump 12 includes a housing 20 with a slurry inlet 22 and a slurry outlet 24. The inlet 22 has a cross sectional area 26 and is surrounded by a flange 30 of conventional construction.

An impeller 34 is mounted inside the housing 20 for rotation about an axis 36 which is centred on the inlet 22.

Figure 2:
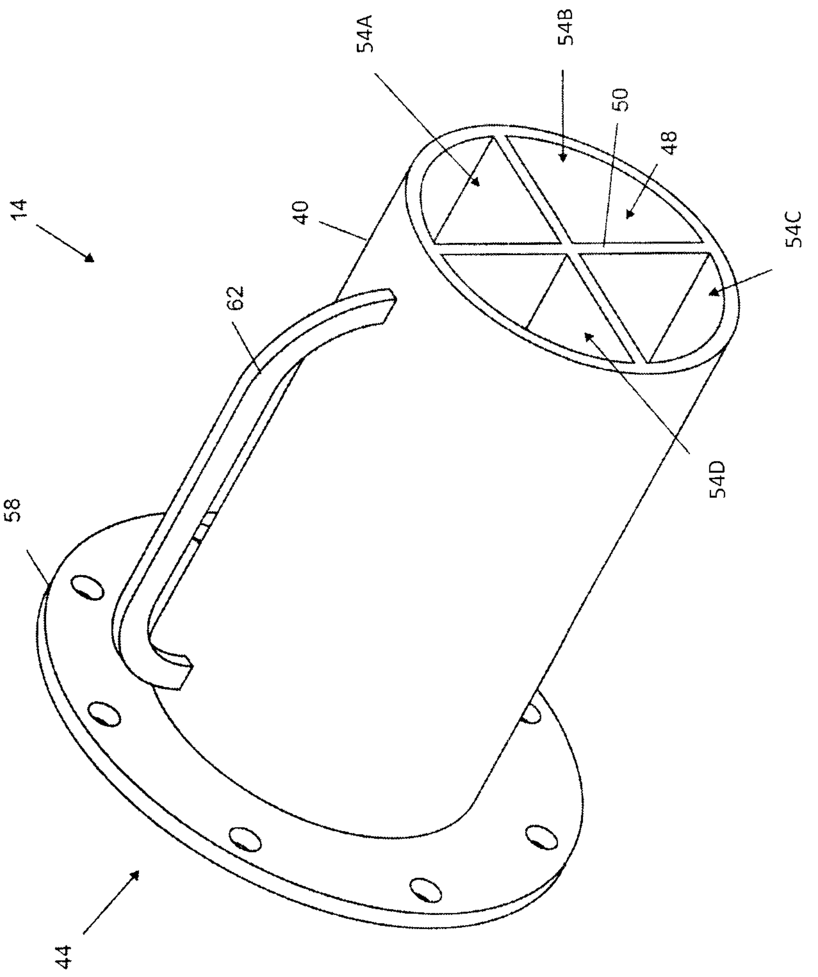
FIG. 2 is a perspective view of a flow corrector included in the pump assembly of FIG. 1.

The flow corrector 14 includes an elongate tubular body 40 with an entry end 42 and an exit end 44. The body 40 is moulded from an appropriate wear-resistant material such as polyurethane and includes a bore 48, see FIG. 2, which is divided by structure 50 which forms an elongate cross-shaped partition 52 into four parallel flow passages 54A, 54B, 54C and 54D respectively. Each flow passage has a quadrant shape in cross section. The cross sectional areas of the passages are substantially the same. Also the flow passages are dimensioned so that the sum of the cross sectional areas of the four flow passages is equal in magnitude to the cross sectional area 26 of the inlet 22 to the housing 20.

The number of the flow passages in the tubular body and the shape of each flow passage can be varied. For example the tubular body can have two, three, five or more flow passages. The invention is not restricted in this respect. The number of flow passages influences the shape of each flow passage. It is to be noted that adjacent flow passages are separated by a common wall which forms a part of the partition 52.

The flow corrector 14 has a flange 58 at the exit end 44 integrally moulded with the body 40. The flange 58 is of complementary shape to the flange 30 at the inlet 22. Thus the flange 58 can be fixed to the flange 30 in a conventional manner using a plurality of fixing bolts or studs 60.

The body 40 has an integrally moulded handle 62 to facilitate handling and manipulation of the flow corrector. The number of handles can be increased particularly if the flow corrector is of a large size.

At the entry end 42 the flow corrector 14 is connected to the discharge end 16 of the slurry supply line 18 by means of an external coupling 66. The nature of the coupling 66 is such that it allows a clearance gap 70 to be established and maintained between opposing surfaces 42A of the entry end 42 and 16A of the discharge end 16.

The body 40 has a central elongate axis 74 which is axially aligned with the axis of rotation 36 of the impeller 34.

Typically, slurry flow in the slurry supply line 18 is of a turbulent or not fully developed nature, and the velocity of the slurry flow is non-uniform and uneven. Thus the magnitude of the mean velocity can deviate substantially across the cross section of the slurry supply line. The flow corrector 14 is intended to address, at least to some extent, these adverse factors.

The parallel flow passages in the flow corrector 14, which have substantially equal cross sectional areas, meaningfully inhibit adverse radial and tangential flow directional velocity components and correct these components to favourable, mostly axially directed, flow components. Additionally, the flow components have a mean velocity magnitude with a reduced standard deviation. In other words the slurry flows through the respective passages are generally parallel to one another, of an axial nature, and at the same velocity.

The direction of the slurry flow inside the housing 20 is changed from axial, to radial and tangential. As the slurry flow from the exit end 44 of the flow corrector 14 is generally uniform, wear on the components inside the housing 20 and on an inner surface of the housing is reduced compared to what occurs in the absence of the flow corrector 14.

The sum of the cross sectional areas of the flow passages 54A to 54D is substantially equal to the magnitude of the cross sectional area 26. Thus the flow corrector 14 effects a minimal pressure drop on the slurry flow and there is only a limited negative effect on the net positive suction head available. Additionally, there are no localised axial velocity variations. The flow corrector 14 therefor allows for optimised flow correction.

The manner in which the flow corrector 14 is connected in the pump assembly 10 is important. In a retrofit situation it is necessary to remove a section of the slurry supply line 18 which is connected to the housing 20. Typically the supply line is a rigid steel suction pipeline. The length of the pipeline section which is removed is gauged to be slightly greater than the length of the body 40 so that the gap 70 is of a predetermined size. The flow corrector body 40 can thus be inserted with ease into the space between the flange 30 and the discharge end 16. The flanges 30 and 58 are then conveniently connected together by means of bolts or studs 60. Thereafter the coupling 66 is used to effect a leak-proof joint between the flow corrector 14 and the slurry supply line 18. This process allows for easy and safe suction pipeline removal, maintenance and installation.

Figure 3:
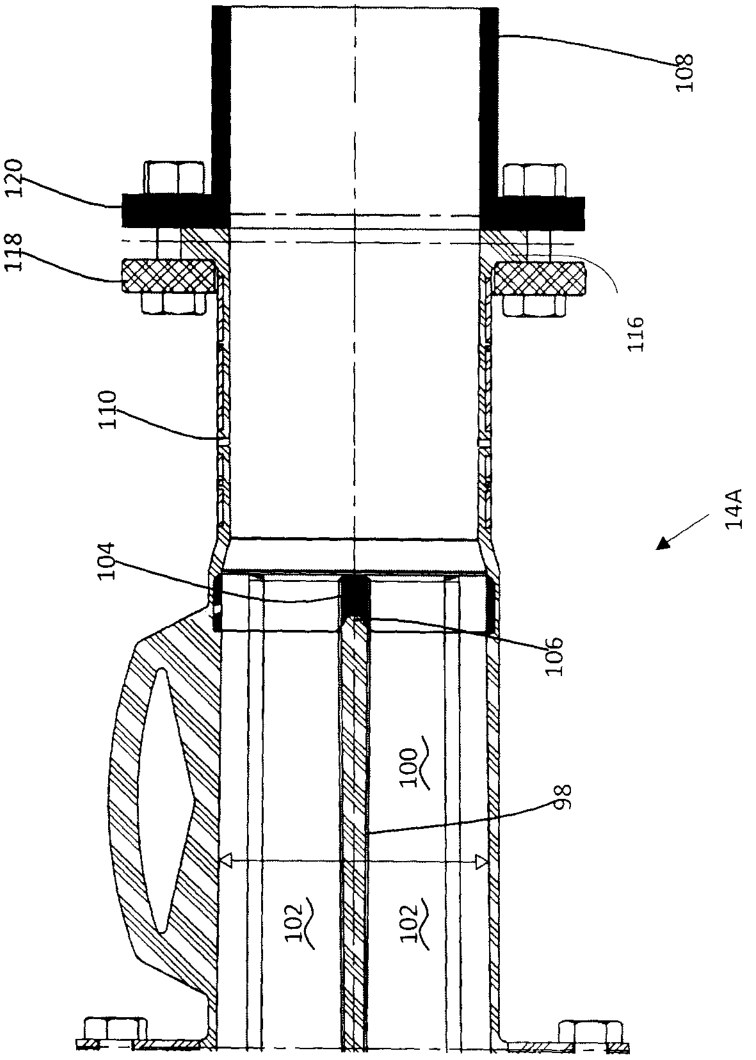
FIG. 3 shows in section a flow corrector with flanges at opposed ends thereof.

FIG. 3 illustrates a modified flow corrector 14A according to the invention. The corrector 14A has a number of similarities to the corrector 14 and for this reason it is not described in detail. However emphasis is placed on points of difference between the two flow correctors.

The flow corrector 14A includes structure 98 in its bore 100 which acts as a partition which divides an interior of the bore 100 into a number of flow passages 102 of equal cross section. The structure 98 has a wear-resistant portion 104 over an end 106 which faces a slurry line 108. A tubular section 110 extends from the end 106. The section 110 is devoid of the flow passages 102.

The section 110 has an integral flange 116. Another flange 118 is directly coupled to a terminal flange 120 on the slurry supply line 108 with the flange 116 sandwiched between opposing surfaces of the flange 118 and 120.

Slurry flow through the supply line 108 and the section 110 impacts directly on an end face of the wear-resistant portion 104. This portion is made from an appropriate material e.g. a high chrome alloy. The section 110 is in the form of a cover which, viewed end on, has the same shape as the structure 98. For example if there are four passages 102 then normally the wear-resistant portion or cover will have a cross shape. Its use extends the operational lifetime of the flow corrector.

Figure 4:
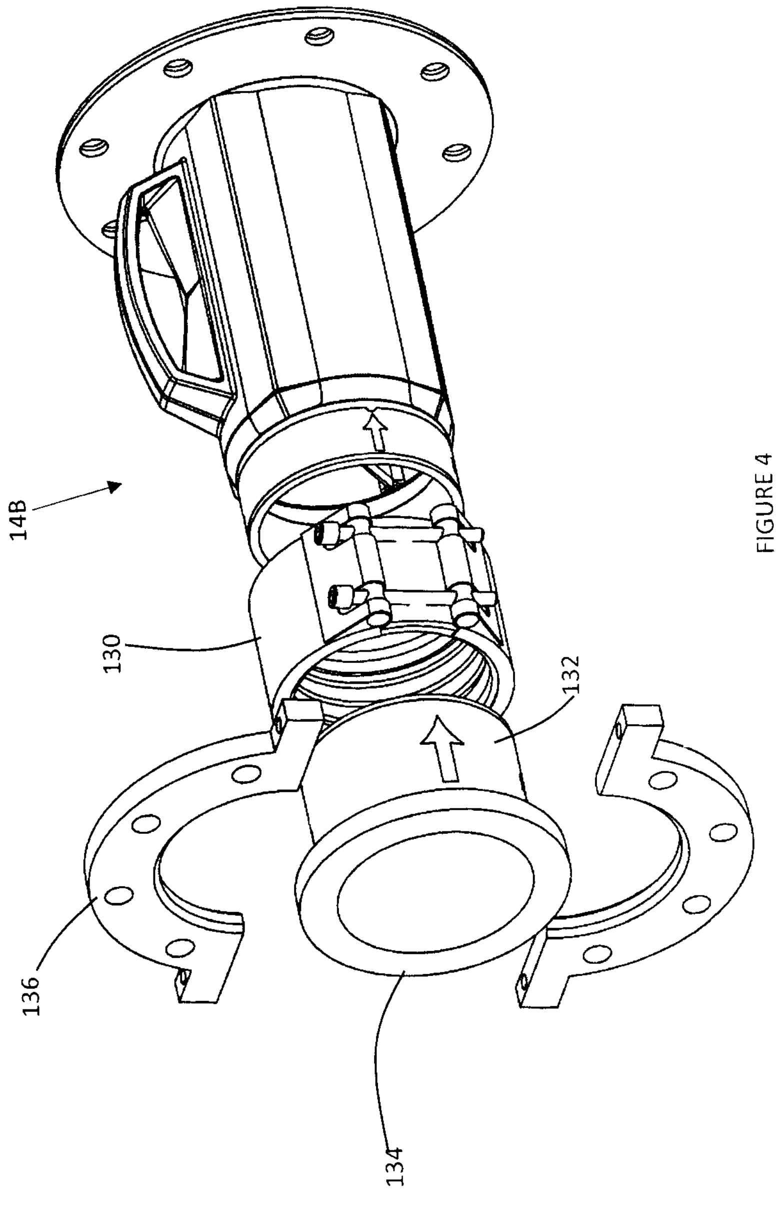
FIG. 4 shows a flow corrector configured to be used with a straub coupling and with a split flange.

FIG. 4 shows a flow corrector 14B which is connectable by means of a straub coupling 130 to an extension piece 132. The extension piece has an integral flange 134 and a split flange 136 is engageable therewith to effect connection to a slurry supply line, not shown.

The use of the straub connector facilitates insertion of the flow corrector into a slurry supply line and allows for the creation of a clearance gap between opposing surfaces of the extension piece 132 and an entry end of the tubular body of the flow corrector. It is possible to enlarge the flange 134 and to form fixing holes in the flange 134, so that the split flange 136 is not required.

Figure 5:
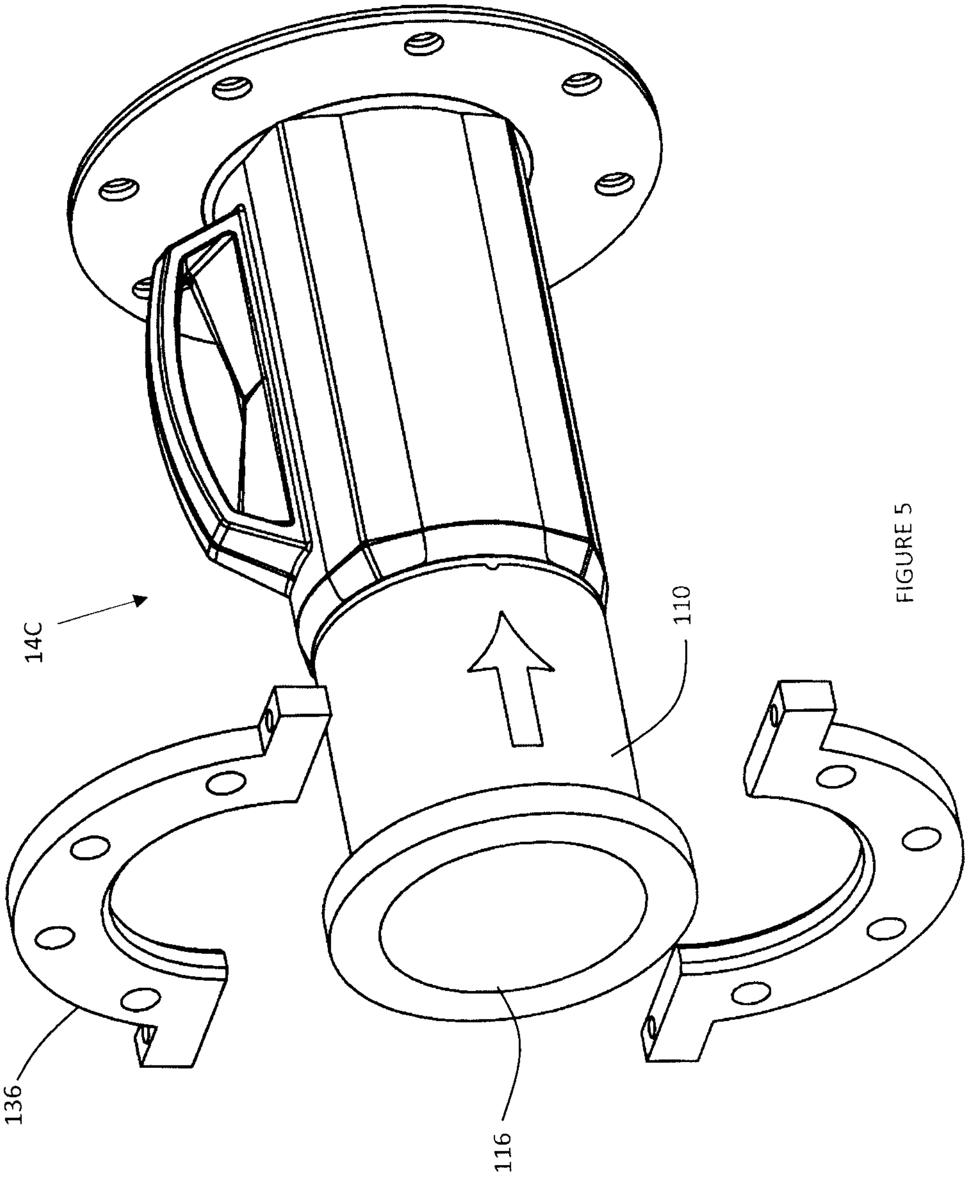
FIG. 5 shows a flow corrector configured to be used with a split flange.

FIG. 5 shows a flow corrector 14C which is similar to the corrector 14A. In this instance though a split flange 136, similar to what is shown in FIG. 4, is used to connect a flange 116 on the flow corrector to a slurry supply line, not shown.

The invention claimed is:

1. A pump assembly (10) including a flow corrector (14) and a slurry pump (12), said slurry pump (12) comprises a housing (20), an inlet (22) to the housing (20), said inlet (22) having a cross sectional area (26) and an impeller (34) mounted inside the housing (20) for rotational movement about an axis (36) which is centred on the inlet (22), said flow corrector (14) including a tubular body (40) which is made from a wear-resistant material with an entry end (42, 42A) which in use is connected to a discharge end (16, 16A) of a slurry supply line (18) and an exit end (44) which in use is connected to the inlet (22) of the housing (20), an interior (48) of the tubular body being configured to correct flow through the tubular body (40) into the housing (20) characterized in that the flow corrector (14) includes a plurality of flow passages (54A, 54B etc.) between the entry end (42) and the exit end (44) and in that the sum of the cross sectional areas of the plurality of flow passages (54A etc.) is equal to said cross sectional area (26).

2. A pump assembly (10) according to claim 1 wherein the tubular body (40) has an elongate axis (74) which is axially aligned with the axis (36) of rotation of the impeller (34).

3. A pump assembly (10) according to claim 2 wherein the plurality of flow passages (54A to 54D) are formed by structure (50) which positions the passages adjacent one another and wherein the structure (50), at an end thereof which is adjacent the entry end (42) of the tubular body, includes a wear-resistant portion (104) against which a part of flow, into the tubular body, directly impacts.

4. A pump assembly (10) according to claim 2 which includes a tubular section (110) which extends from the entry end (42, 42A) of the tubular body (40) and which is devoid of any portion of the plurality of flow passages.

5. A pump assembly (10) according to claim 1 wherein the cross sectional areas of the plurality of flow passages (54A to 54D) are substantially the same.

6. A pump assembly (10) according to claim 5 which includes a tubular section (110) which extends from the entry end (42, 42A) of the tubular body (40) and which is devoid of any portion of the plurality of flow passages.

7. A pump assembly (10) according to claim 1 wherein said tubular body (40) is made from, or is lined with, rubber or polyurethane, or is made from a high chrome alloy.

8. A pump assembly (10) according to claim 1 wherein the plurality of flow passages (54A to 54D) are formed by structure (50) which positions the passages adjacent one another and wherein the structure (50), at an end thereof which is adjacent the entry end (42) of the tubular body, includes a wear-resistant portion (104) against which a part of flow, into the tubular body, directly impacts.

9. A pump assembly (10) according to claim 1 which includes a tubular section (110) which extends from the entry end (42, 42A) of the tubular body (40) and which is devoid of any portion of the plurality of flow passages.

10. A pump assembly (10) according to claim 1 wherein a clearance gap (70) is provided between said entry end (42A) of the tubular body (40) and said discharge end (16A) of the slurry supply line (18).

* * * * *